United States Patent [19]
Zollman

[11] 3,996,808
[45] Dec. 14, 1976

[54] SAFETY LOCK FOR POWER DRIVEN MACHINES

[76] Inventor: Orville D. Zollman, 893 Hillview Drive, Ashland, Oreg. 97520

[22] Filed: July 21, 1975

[21] Appl. No.: 597,966

[52] U.S. Cl. .............................. 74/217 C; 188/82.8
[51] Int. Cl.² ..................... F16H 9/00; F16D 63/00
[58] Field of Search .......... 188/82.1, 82.8; 70/233, 70/236; 74/217 C; 254/155, 156; 198/1

[56] References Cited
UNITED STATES PATENTS

| 601,047 | 3/1898 | Slingerland | 70/236 |
|---|---|---|---|
| 2,828,833 | 4/1958 | Civello | 188/82.8 |

*Primary Examiner*—Carlton R. Croyle
*Assistant Examiner*—G. L. LaPointe
*Attorney, Agent, or Firm*—Clarence M. Crews

[57] ABSTRACT

It is common practice in factories to provide a multiplicity of electrically operated belt or chain driven mechanisms, each controlled by one of a multiplicity of switches located in a common panel. When a mechanism is out of order and requires servicing, it is usual to throw its control switch to an open-circuited condition for the protection of a repairman. All too frequently, someone closes the wrong switch, thereby setting the idled machine into unintended motion so that a serious injury to the repairman results. In accordance with the present invention a massive wedging means is provided for application to a chain or belt in such manner that essentially all motion is positively prevented.

4 Claims, 5 Drawing Figures

SAFETY LOCK FOR POWER DRIVEN MACHINES

This invention relates to protective means for rendering a power operated chain or belt driven machine absolutely motionless, or essentially so.

It has long been common practice to apply a padlock or similar device to the chain of a bicycle for safeguarding the bicycle against theft. This practice, however, falls short of accomplishing an objective analogous to that achieved by the present invention.

The bicycle is not power operated and has not, therefore, a comparable potential for causing serious injury.

The protection against theft afforded by a bicycle chain padlock can be readily overcome, moreover, by the simple expedient of lifting the rear wheel off the ground so that only the unlocked front wheel is required to turn as the thief wheels the bicycle away.

The present invention is not designed as a safeguard against theft, but as a safeguard against injury to a repairman who is working on an idled machine which is normally power operated.

It is common practice in factories for a large number of machines to be power operated, each under the control of its individual switch, with all the control switches included in a common panel. In the circumstances it is not uncommon for someone, through carelessness or ignorance, to close a wrong switch and thereby cause serious injury to a repairman. Even a slight unintended motion may prove disastrous.

It is accordingly an object of the present invention to provide a massive and sturdy wedging device which is adapted to be fixedly secured on a flexible drive member such as a chain or belt in contact with a sprocket or pulley as the case may be, for opposing positive resistance to any significant operation of the machine.

The chain or pulley may be driven through a slip clutch associated with an input drive shaft so that effective blocking of operation can be readily realized. Alternatively, a fuse in the drive circuit of the particular machine may be caused to blow by the blocking of the drive train.

Other objects and advatages will hereinafter appear.

In the drawing forming part of this specification,

Figure 1:
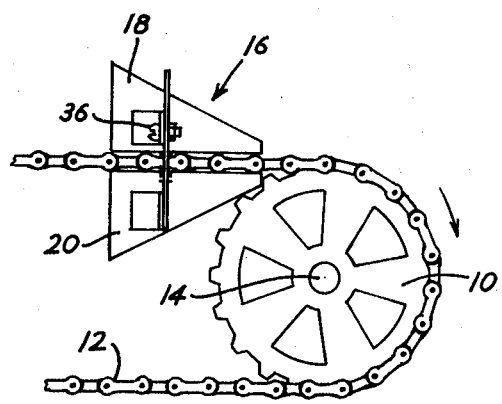
FIG. 1 is a fragmentary view in side elevation showing a chain and sprocket combination positively locked against operation by one form of my novel wedge protector.

In FIG. 1 disclosure is made of a sprocket 10 which has a driving chain 12 trained upon it. It may be assumed that under normal conditions the shaft 14, upon which the sprocket is made fast, is powerfully driven by an electric motor (not shown) through the chain and sprocket, in the direction indicated by the arrow.

Figure 3:
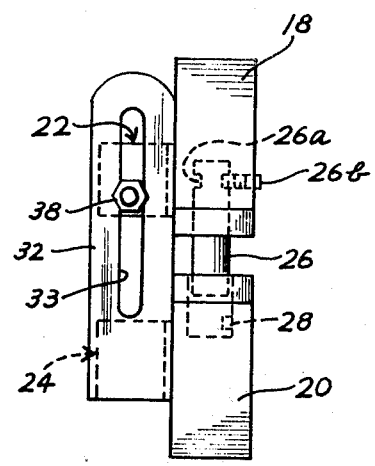
FIG. 3 is a view in end elevation of the wedge protector of FIGS. 1 and 2.

As shown in FIG. 1, however, rotation of the shaft and sprocket are positively prevented by a wedge protector 16 (FIGS. 1 to 3) which is affixed to the chain and engages the sprocket. The wedge protector 16 comprises complementary, triangular wedge blocks 18 and 20 which are desirably of identical shape and size and are designed to clamp the chain firmly between them.

The wedge member 18 has affixed to it, as by welding, an L-shaped bracket 22, while the wedge member 20 has similarly affixed to it an L-shaped bracket 24.

The wedge member 18 has unitary with it a cylindrical stem or pin member 26 which is adapted to be passed through a chain link and to fit into an appropriately shaped recess 28 of the block 20.

The pin 26 is formed with a circumferential groove 26a which is adapted to receive a set screw 26b. The set screw 26b is threaded into a bore of wedge member 18 for lodgment of its inner end in the groove 26a. Withdrawal of the set screw 26b enables the pin 26 to be withdrawn, thereby adapting the device of FIGS. 1 to 3 for use with a belt and pulley combination.

The bracket 24 includes a fixed outstanding ear 30 to which an upstanding plate 32 is affixed, as by welding. The plate 32 is formed with a slot 33. The bracket 22 includes a fixed outstanding ear 34 which is adapted to be disposed in coplanar relation to the ear 30 of bracket 22. The ear 34 is formed with a bore for receiving the shank of a headed screw 36. The shank of the screw is passed through the bore of ear 34 and the slot 33, and is secured firmly in place by a nut 38. The blocks 18 and 20 are thus clamped firmly to one another in fixed relation to the chain 12.

Figure 2:
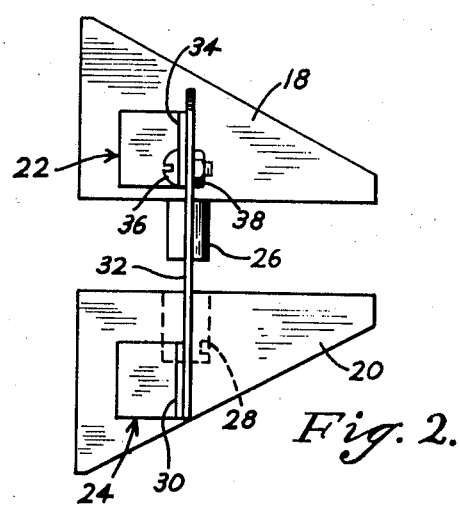
FIG. 2 is a view in side elevation of the wedge protector of FIG. 1 in a relaxed, ineffective condition.

The illustrative blocks 18 and 20 are nearly in the form of right triangles as seen in side elevation, but the forward tips of the blocks are cut away, making the blocks trapezoidal in form as seen in FIGS. 1 and 2.

The blocks would normally be applied to the chain in substantially the exact relationship shown in FIG. 1.

Figure 4:
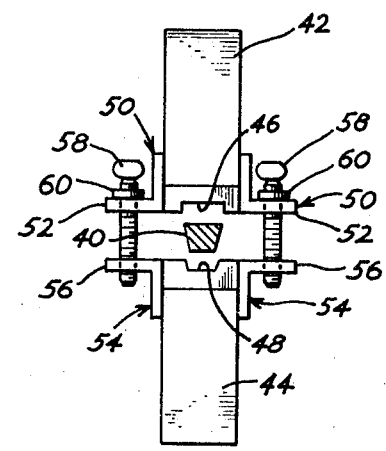
FIG. 4 is a view in end elevation of a modified form of wedge protector adapted for use in conjunction with a belt and pulley.
Figure 5:
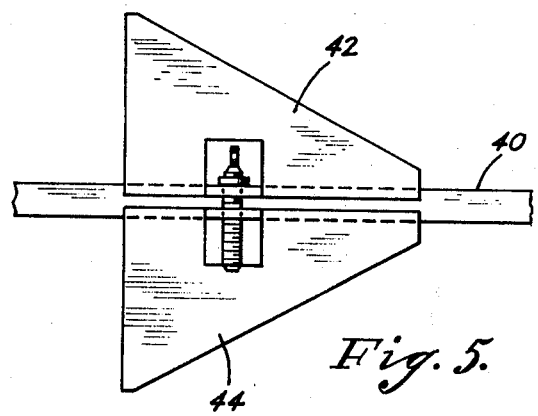
FIG. 5 shows details of the protector of FIG. 4 applied to a belt, the pulley being omitted from the view.

A modified embodiment of the invention is shown in FIGS. 4 and 5, designed for use in connection with a belt driven machine in which a drive belt 40 runs on pulleys (not shown).

Trapezoidal blocks 42 and 44 of the same configuration as blocks 18 and 20 are adapted to be clamped on the upper run of the drive belt 40.

The blocks 42 and 44 are formed, respectively, with relatively broad and narrow channels 46 and 48 for engaging the broader upper face of the belt and the narrower lower face of the belt.

The upper block 42 has affixed to opposite sides, at its lower end, angle brackets 50 which include outturned perforated ears 52. The lower block 44 has affixed to opposite sides, at its upper end, angle brackets 54 which include outturned perforated ears 56. Thumb screws 58 have their shanks passed freely downward through the ears 52 of brackets 50 and threaded through the ears 56 of brackets 54. Collars 60, threaded on the shanks of screws 58, may be adjusted to bear firmly downward against the upper faces of ears 52 for adjusting the blocks to clamp the belt with a desired degree of firmness.

The holding of the belt or chain, as the case may be, against advance will normally cause a fuse through which current is supplied to the drive motor of the involved machine to blow, thereby relieving the mechanism of damaging strain while obviating the danger of injury to the repairman.

I have described what I believe to be the best embodiment of my invention. What I desire to cover by letters patent, however, is set forth in the appended claims.

I claim:

1. A protective device for preventing possibly dangerous operation of a machine undergoing repairs, which machine is normally driven through a train comprising a rotary member and an endless flexible drive member therefor, said device including opposed clamping blocks at least one of which is wedge-shaped, and means for firmly securing the blocks to one another in clamping relation to the flexible drive member with the tapered end of a wedge-shaped clamping block leading between the flexible drive member and the rotary member driven thereby, the opposed clamping blocks being formed laterally with connecting means through which the blocks may be joined to clamp the flexible drive member firmly between them.

2. A protective device as set forth in claim 1 in which the clamping blocks are essentially identical in shape, the construction and arrangement being such that either of the joined blocks may be disposed between the flexible driving member and the rotary member driven thereby, and the laterally formed connecting means for connecting the blocks may be disposed at either side of the flexible driving member and the rotary member driven thereby.

3. A protective device as set forth in claim 1 in which the clamping blocks have ears disposed in a common plane, one of which has affixed to it a plate having an elongated slot that extends crosswise of the clamping faces of the blocks, and the other of which carries a screw that extends through the slot, and a clamping nut threaded on the screw.

4. A protective device as set forth in claim 1 in which the clamping blocks are formed with grooves appropriately dimensioned to receive and firmly clamp a drive belt between them, the blocks are provided with pairs of confronting brackets and clamping screws are provided in association with said brackets for drawing and holding opposed clamping blocks toward one another.

* * * * *